(12) United States Patent
Flasco

(10) Patent No.: US 10,925,268 B1
(45) Date of Patent: Feb. 23, 2021

(54) INSIDE CORNER CUBIC SURFACE REFLECTOR FISHING LURE

(71) Applicant: Ray D. Flasco, Akron, OH (US)

(72) Inventor: Ray D. Flasco, Akron, OH (US)

(*) Notice: Subject to any disclaimer, the term of this patent is extended or adjusted under 35 U.S.C. 154(b) by 528 days.

(21) Appl. No.: 14/657,376

(22) Filed: Mar. 13, 2015

(51) Int. Cl.
| A01K 85/01 | (2006.01) |
| A01K 85/00 | (2006.01) |
| A01K 85/14 | (2006.01) |
| A01K 85/16 | (2006.01) |
| A01K 85/10 | (2006.01) |

(52) U.S. Cl.
CPC .............. *A01K 85/01* (2013.01); *A01K 85/00* (2013.01); *A01K 85/10* (2013.01); *A01K 85/14* (2013.01); *A01K 85/16* (2013.01)

(58) Field of Classification Search
CPC ........ A01K 85/00; A01K 85/12; A01K 85/10; A01K 85/01; A01K 85/14; A01K 85/16
USPC ........... 43/42.06, 42.32, 42.33, 42.34, 42.31; 359/530
See application file for complete search history.

(56) References Cited

U.S. PATENT DOCUMENTS

| 153,854 | A |   | 8/1874 | Skinner |
| 341,954 | A |   | 5/1886 | Skinner |
| 468,361 | A |   | 2/1892 | Pflueger |
| 1,180,753 | A | * | 4/1916 | Zeigler ................. A01K 85/16 43/42.16 |
| 1,300,149 | A |   | 4/1919 | Evans |
| 1,477,864 | A |   | 12/1923 | Bolton |
| 1,591,572 | A | * | 7/1926 | Stimson ................ C03B 11/06 65/362 |
| 1,787,733 | A | * | 1/1931 | Pagin .................... A01K 85/16 43/42.34 |
| 1,822,451 | A | * | 9/1931 | Oestnaes .............. C03B 11/082 249/112 |
| 1,906,655 | A | * | 5/1933 | Stimson ................ C03B 11/06 65/362 |
| 1,993,868 | A |   | 3/1935 | Thornberg |
| 1,997,500 | A |   | 4/1935 | Swarovski |
| 2,117,206 | A |   | 5/1938 | Neff |
| 2,167,149 | A | * | 7/1939 | Grote .................... G02B 5/124 40/582 |
| 2,192,563 | A |   | 3/1940 | Starkey |
| 2,241,941 | A | * | 5/1941 | Bates .................... A01K 85/16 43/42.33 |
| 2,338,577 | A | * | 1/1944 | Divine .................. A01K 85/16 43/42.34 |

(Continued)

FOREIGN PATENT DOCUMENTS

| FR | 2427786 A1 * | 1/1980 | ............ A01K 85/10 |
| JP | 09224529 A * | 9/1997 | ............ A01K 85/16 |

(Continued)

OTHER PUBLICATIONS

Translation of FR 2427786 (Year: 1980).*

Primary Examiner — Darren W Ark
(74) Attorney, Agent, or Firm — Renner Kenner Greive Bobak Taylor & Weber Co., LPA

(57) ABSTRACT

Fishing tackle including, weights, sinkers, floats, bobbers, soft bait (plastic and rubber lures) hard bait lures, spinners, spoons and jigs incorporating cubic corner reflector for enhancing and reflecting fluid pressure waves generated by game fish with the reflected and enhanced pressure waves attracting the attention of the target fish and enticing it to strike at the lure.

15 Claims, 8 Drawing Sheets

(56) References Cited

U.S. PATENT DOCUMENTS

| | | | |
|---|---|---|---|
| 2,457,358 A * | 12/1948 | Flaugher | A01K 95/00 43/44.96 |
| D154,141 S | 6/1949 | Pilblad | |
| 2,480,580 A * | 8/1949 | Hopkins | A01K 85/14 43/42.45 |
| D161,716 S | 1/1951 | Starkey | |
| D162,018 S | 2/1951 | Finberg | |
| 2,547,240 A | 4/1951 | Young et al. | |
| 2,657,495 A | 11/1953 | Eppinger | |
| 2,736,125 A * | 2/1956 | Perkins | A01K 85/14 43/42.34 |
| 3,133,372 A * | 5/1964 | Born | A01K 85/16 43/42.34 |
| 3,143,825 A | 8/1964 | Borgstrom | |
| 3,413,750 A * | 12/1968 | Henry | A01K 85/10 43/42.33 |
| 3,494,065 A * | 2/1970 | Benttinen | A01K 85/16 43/42.33 |
| 3,712,706 A * | 1/1973 | Stamm | G02B 5/124 359/531 |
| 3,879,883 A * | 4/1975 | Strader | A01K 85/16 43/42.32 |
| 3,922,065 A * | 11/1975 | Schultz | G02B 5/124 359/514 |
| 3,948,714 A * | 4/1976 | Steiner | F21V 7/00 156/245 |
| D242,349 S * | 11/1976 | Pitrola | D22/126 |
| 4,037,346 A * | 7/1977 | Holst | A01K 85/12 43/42.14 |
| 4,066,331 A * | 1/1978 | Lindner | G02B 5/124 359/514 |
| 4,180,936 A * | 1/1980 | Davis | A01K 85/14 43/42.5 |
| 4,189,209 A * | 2/1980 | Heasley | G02B 5/124 359/530 |
| 4,202,600 A * | 5/1980 | Burke | G02B 5/124 359/514 |
| 4,486,073 A * | 12/1984 | Boyd | E06B 9/386 160/166.1 |
| D282,560 S | 2/1986 | Korpua | |
| 4,631,854 A * | 12/1986 | Rosko | A01K 85/00 359/546 |
| 4,700,504 A * | 10/1987 | Mattison | A01K 85/16 43/17.6 |
| 4,788,788 A * | 12/1988 | Brockett | A01K 97/02 43/44.2 |
| 5,084,996 A | 2/1992 | Woodruff et al. | |
| 5,117,304 A * | 5/1992 | Huang | C08G 18/751 359/529 |
| 5,171,624 A * | 12/1992 | Walter | G02B 5/124 359/530 |
| 5,226,268 A * | 7/1993 | Sisson, Jr. | A01K 85/00 43/42.11 |
| 5,237,449 A * | 8/1993 | Nelson | G02B 3/0006 359/529 |
| 5,450,235 A * | 9/1995 | Smith | B29C 39/148 359/529 |
| D376,189 S | 12/1996 | Thomas | |
| 5,812,315 A * | 9/1998 | Smith | G02B 5/124 359/529 |
| 5,831,767 A * | 11/1998 | Benson | G02B 5/124 359/529 |
| 5,926,314 A * | 7/1999 | Smith | G02B 5/124 359/530 |
| 6,158,161 A * | 12/2000 | Rossman | A01K 85/16 43/42.06 |
| 6,172,810 B1 * | 1/2001 | Fleming | G02B 5/124 359/529 |
| 6,301,823 B1 * | 10/2001 | Monticello | A01K 85/14 43/42.09 |
| 6,643,975 B1 * | 11/2003 | Edwards | A01K 85/14 43/42.31 |
| 6,877,866 B2 * | 4/2005 | Nilsen | G02B 5/124 359/529 |
| 7,045,278 B2 * | 5/2006 | Ihara | G02B 5/124 216/2 |
| 7,621,072 B2 * | 11/2009 | Brasseur | A01K 95/00 43/42.34 |
| 7,752,801 B2 * | 7/2010 | Choi | A01K 85/01 43/42.34 |
| 7,793,457 B2 * | 9/2010 | Hogan | A01K 91/04 43/42.1 |
| 8,049,846 B2 * | 11/2011 | Fujiwara | G02F 1/133553 349/113 |
| 8,177,374 B2 * | 5/2012 | Wu | B29D 11/00605 359/530 |
| 8,196,337 B2 * | 6/2012 | Simmons | A01K 85/00 43/42.32 |
| 8,231,234 B2 * | 7/2012 | Chapman | B29D 11/00605 359/530 |
| 8,317,341 B2 * | 11/2012 | Kim | G02B 5/124 359/529 |
| 8,414,135 B2 * | 4/2013 | Ishii | F21V 7/04 359/530 |
| 8,496,339 B2 * | 7/2013 | Nakajima | G02B 5/0816 359/530 |
| 8,511,840 B2 * | 8/2013 | Mimura | G02B 5/124 359/530 |
| 8,668,341 B2 * | 3/2014 | Caswell | G02B 21/367 359/530 |
| 8,950,877 B2 * | 2/2015 | Northey | G02B 5/124 359/530 |
| 9,010,945 B2 * | 4/2015 | Vasylyev | B29D 11/00278 359/530 |
| 9,482,795 B2 * | 11/2016 | Tillotson | G02B 5/122 |
| 2002/0073606 A1 * | 6/2002 | Mameamskum | A01K 85/14 43/42.5 |
| 2002/0154408 A1 * | 10/2002 | Minoura | G02B 5/124 359/529 |
| 2002/0157300 A1 * | 10/2002 | Saul | A01K 85/00 43/42.33 |
| 2003/0074830 A1 * | 4/2003 | Goeke | A01K 85/01 43/42.39 |
| 2004/0020101 A1 * | 2/2004 | Northrop | A01K 85/12 43/42.13 |
| 2005/0088742 A1 * | 4/2005 | Fujiwara | G02B 5/124 359/530 |
| 2006/0139754 A1 * | 6/2006 | Bacon, Jr. | G02B 5/124 359/530 |
| 2007/0163165 A1 * | 7/2007 | Castro | A01K 85/00 43/42.06 |
| 2009/0273839 A1 * | 11/2009 | Henrichs | C25D 1/10 359/530 |
| 2010/0045576 A1 * | 2/2010 | Park | H01L 51/5281 345/76 |
| 2013/0148201 A1 * | 6/2013 | Benson | B29C 33/3842 359/530 |
| 2014/0078586 A1 * | 3/2014 | Spurgeon | G02B 5/124 359/530 |
| 2015/0049384 A1 * | 2/2015 | Coggio | G02B 5/124 359/530 |
| 2016/0091639 A1 * | 3/2016 | Winter | G02B 5/122 359/529 |
| 2016/0202398 A1 * | 7/2016 | Coggio | G02B 5/124 359/530 |

FOREIGN PATENT DOCUMENTS

| | | | |
|---|---|---|---|
| JP | 3211458 U * | 7/2017 | |
| JP | 6429066 B2 * | 11/2018 | A01K 85/01 |
| WO | WO-2006112809 A1 * | 10/2006 | A01K 85/01 |

* cited by examiner

INSIDE CORNER CUBIC SURFACE REFLECTOR FISHING LURE

BACKGROUND OF THE INVENTION

Field of the Invention

The present invention relates generally to sports equipment and, more specifically, to fishing tackle having at least one cubic corner reflector therein comprising three planar adjacent surfaces substantially perpendicular so that pressure waves moving through water, such as those generated by game fish, are reflected by the three surfaces back to the source of the pressure wave thereby alerting the game fish to the presence and location of the fishing lure.

Description of the Prior Art

There are other fishing lures which provide for attracting fish. While these fishing lures may be suitable for the purposes for which they where designed, they would not be as suitable for the purposes of the present invention as heretofore described.

It is thus desirable to provide a fishing lure with means for directing fish propagated pressure waves back to the fish alerting said fish to the presence of said lure.

It is further desirable to provide the lure with at least one cubic corner reflector that will redirect the aforementioned pressure wave(s) back to the fish generating said waves.

SUMMARY OF THE PRESENT INVENTION

The present invention discloses incorporating at least one cubic corner reflector, consisting of three substantially perpendicular, mutually adjacent planar surfaces, (an inside corner of a cube), into fishing tackle including, weights, sinkers, floats, bobbers, soft bait (plastic and rubber lures) hard bait lures, spinners, spoons and jigs.

A primary object of the present invention is to provide an improved fishing lure that increases the chances of a fish striking the lure.

Another object of the present invention is to reflect fluid pressure waves generated by a fish directly back to the fish by virtue of fishing tackle incorporating one or more cubic corner reflectors allowing the fish to more easily detect the presence of the fishing tackle.

Another object of the present invention is to incorporate cubic corner reflectors into existing fishing tackle to enhance their reflection of fluid pressure waves back to the game fish.

Yet another object of the present invention is to incorporate at least one cubic corner reflector into hard bait lures, spinners, spoons and jigs.

Still yet another object of the present invention is to incorporate at least one cubic corner reflector into fishing tackle including weights, sinkers, floats and bobbers.

An additional object of the present invention is to incorporate the cubic corner reflector into soft bait including plastic and rubber molded lures to enhance their detection by game fish.

A further object of the present invention is to provide fishing lures having cubic corner reflectors incorporated into their bodies to enhance the "visibility" of the lure by reflecting propagated pressure waves within the water back to the lateral line sensory organs of the target fish.

A further object of the present invention is to create patterned sonic movement in the water to attract game fish.

A yet further object of the present invention is to present an enticing feel to the lure once the game fish contacts the surface of the invention.

A still yet further object of the present invention is to provide a lure having an exterior surface with at least one cubic corner reflector within said body.

Another object of the present invention is to provide a fishing lure having an external surface with a portion of said lure having a plurality of conjoined cubic corner reflectors therein.

Yet another object of the present invention is to provide a fishing lure having an external surface encompassed by cubic corner reflectors.

Another object of the present invention is to provide an improved fishing lure that takes advantage of the pressure waves generated by the fish moving through the water by reflecting them back towards the fish, thus increasing the lure's "visibility".

Yet another object of the present invention is to provide a fishing lure that incorporates corner cube reflecting geometry to increase the likelihood of the target noticing the lure.

Still yet another object of the present invention is to provide a method for improving an existing fishing lure by adding the novel corner reflectors of the present invention to increase fluid pressure wave reflection from a fishing tackle lure.

Additional objects of the present invention will appear as the description proceeds.

The present invention overcomes the shortcomings of the prior art by providing fishing tackle with at least one cubic corner reflector therein having three planar adjacent surfaces substantially perpendicular so that pressure waves moving through water, such as those generated by game fish, are reflected by the three surface back to the source of the pressure wave thereby alerting the game fish to the presence and location of the fishing lure.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures.

10 fishing tackle incorporating cubic corner reflector(s)
12 cubic corner reflector
14 fishing lure
16 fishing line
18 target fish
20 lateral line sensory organs of 16

22 propagated pressure wave from the fish
24 reflected pressure wave from lure reflector
26 lure body
28 fish hooks
30 lure movement enhancer
32 fishing line attachment means
34 periphery of wave reflecting indentation
34a first reflecting surface
34b second reflecting surface
34c third reflecting surface
34d vertex of 32a, 32b, and 32c
36 corner cube wave "bounce"
38 soft bait incorporating wave reflector
40 spinner bait incorporating wave reflector
42 spoon bait incorporating wave reflector
44 jig bait incorporating wave reflector
46 first angle (34a, 34c)
48 second angle (34a, 34b)
50 third angle (34b, 34c)

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
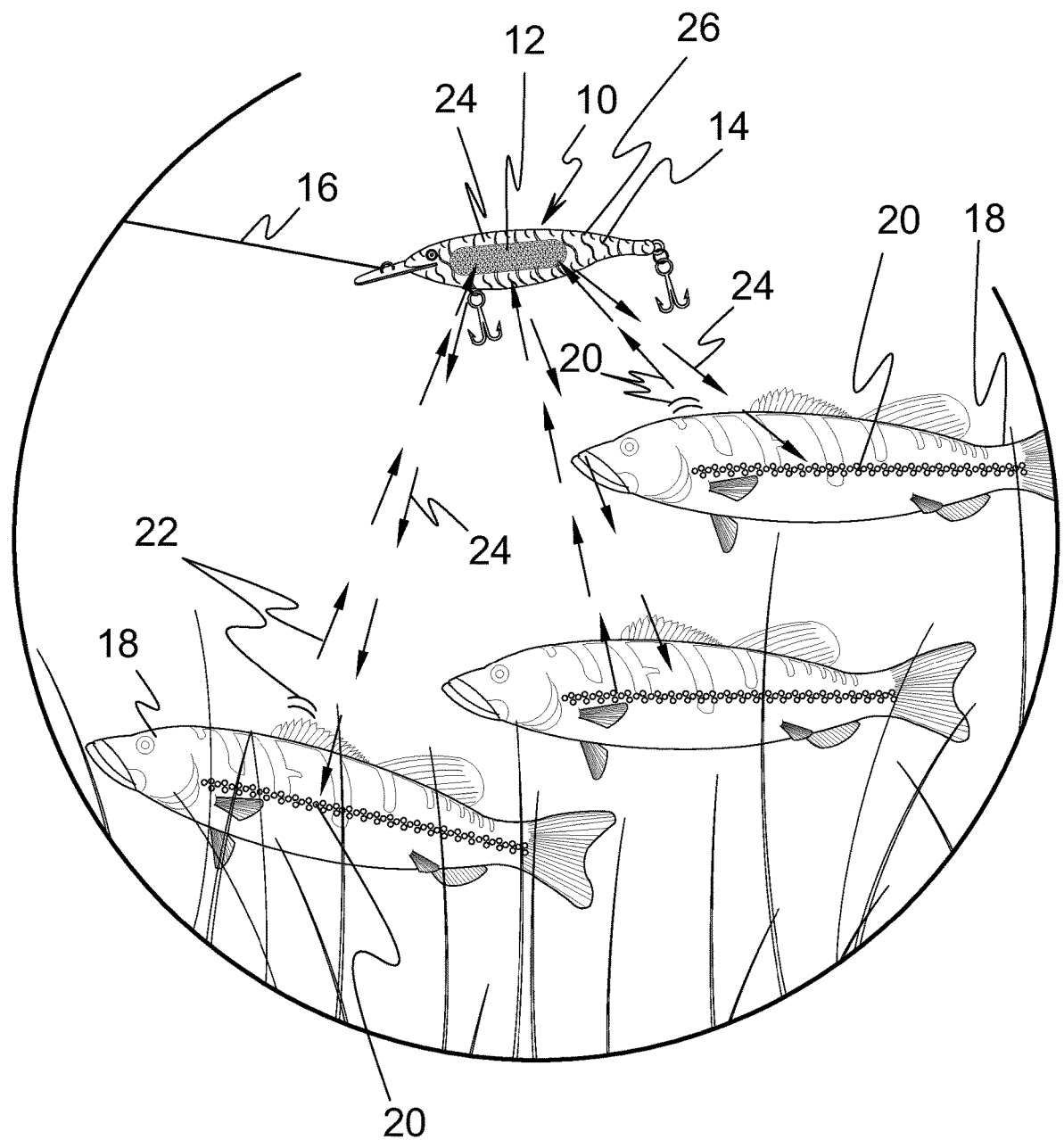
FIG. 1 is an illustrative view of the cubic corner reflector in use.

Referring to FIG. 1, shown is an illustrative view of the cubic corner reflector in use. Fishing lure 14 is trailed through the water by line 16. In the embodiment seen in the Figure, the wave reflection portion 3 is comprised of a plurality of cubic corner reflectors 12 with each consisting of three mutually perpendicular, intersecting planar surfaces that reflect fluid pressure waves from game fish directly back towards the source. Incoming pressure waves 22 are reflected three times, once by each surface resulting in a reversal of pressure wave direction 24 alerting the fish 18 to the presence and location of the lure. It should be noted from the outset that the fishing tackle incorporating cubic corner reflector(s) 10 could be positioned within any external surface of the fishing tackle body 14 and that the lure 14 itself may be of many different types as will be discussed further hereinbelow. As aforementioned, the propagated pressure waves 22 are generated by target fish 18 movement and the returning reflected pressure wave 24 emanate from cubic corner reflectors 12 within lure body 14. Reflected pressure wave 22 is detected by the lateral line sensory organs 20 located on the target fish 18. These sensory organs are well known within aquatic vertebrates and in a way conform to the sense of touch in a mammal.

Figure 2:
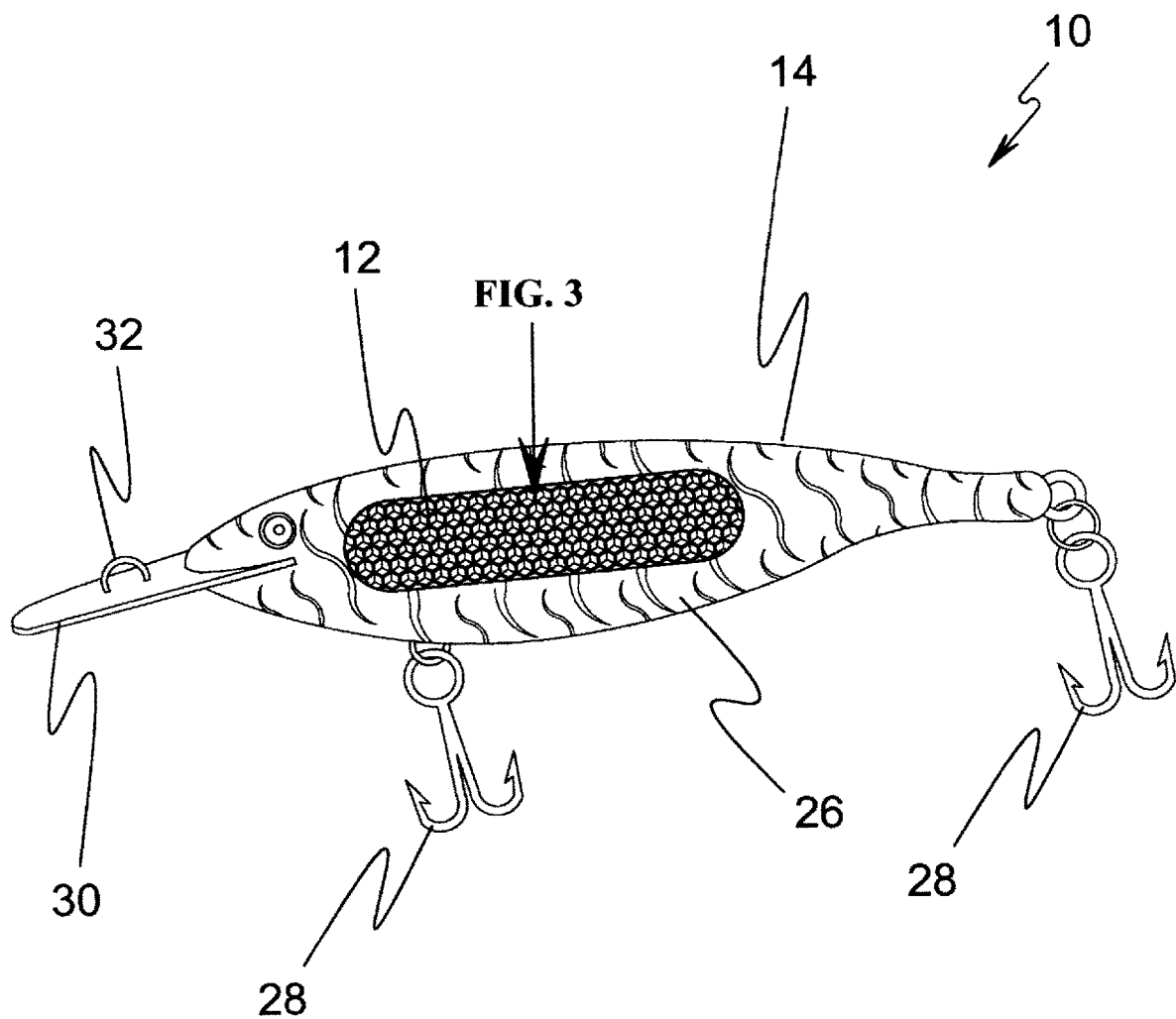
FIG. 2 is a fishing lure having a section of corner reflectors therein.

Referring to FIG. 2, depicted is a fishing tackle lure having a section comprising a plurality of corner reflectors therein. The fishing tackle incorporating cubic corner reflector(s) 10 provides a fishing lure 14 having lure body 26 having in whole or in part a plurality of corner reflectors 12 within said lure body 26 consisting of three substantially perpendicular, intersecting planar surfaces which reflect pressure waves back towards the source of the pressure waves. Additionally shown in the figure are fish hooks 28, and the lure movement enhancer 30 (shown here as a forwardly depending spoon with the fishing line attachment means 32 located thereon).

Figure 3:
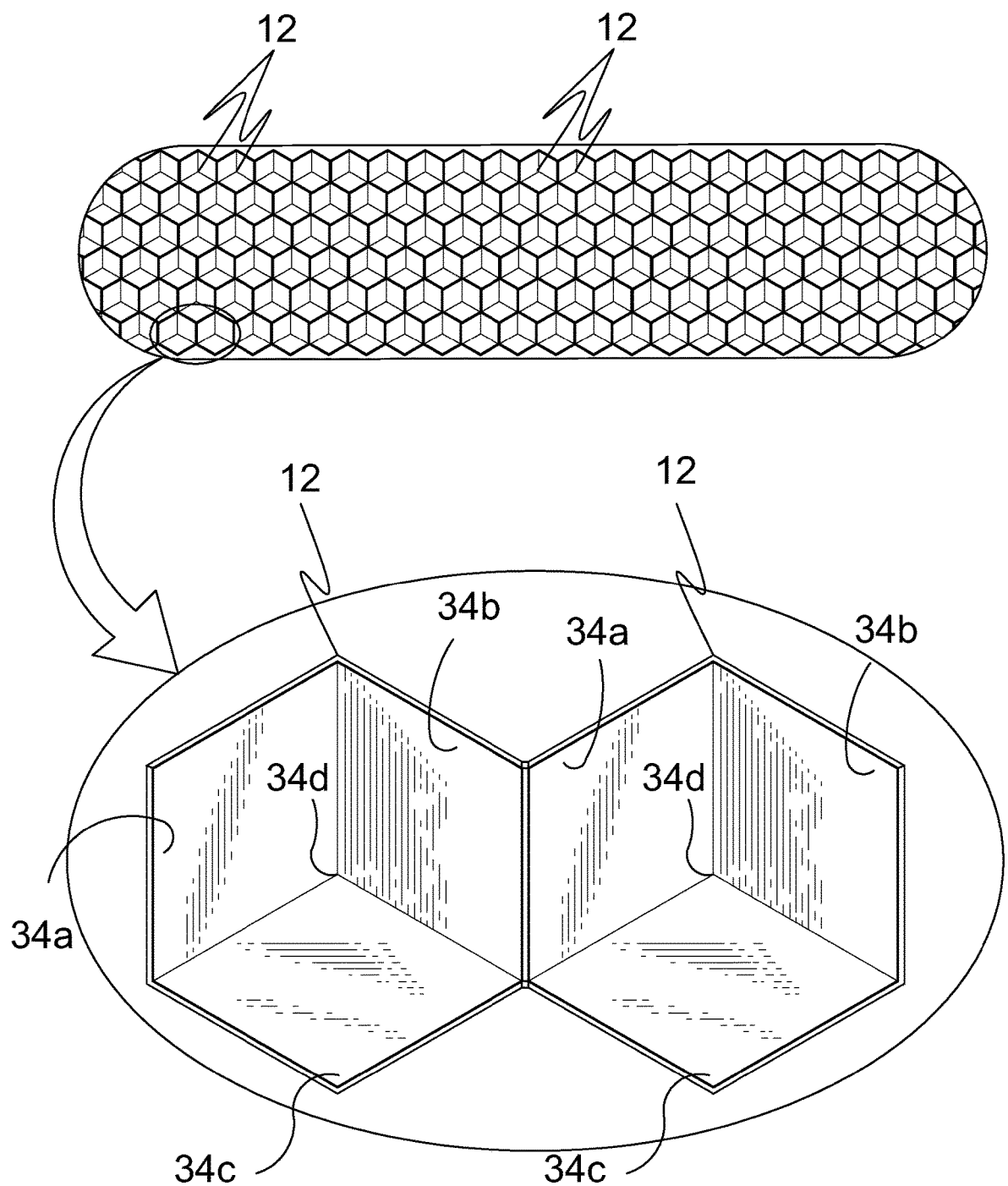
FIG. 3 is an enlarged view of the section of corner reflectors, taken from the fishing lure of FIG. 2.

Referring to FIG. 3, shown is an enlarged view of the segment of corner reflectors, taken from the fishing lure of FIG. 2. Depicted is an enlarged view of the plurality of cubic corner reflectors 12 positioned within the body 26 of fishing tackle lure 14 forming a cluster of conjoined cubic corner reflectors 12 with each of the corner reflectors 12 comprising three substantially perpendicular adjacent planar surface 34a, 34b, 34c having vertex 34d with the planar surfaces reflecting fluid pressure waves generated by game fish directly back towards the source. Incoming pressure waves 22 are reflected three times, once by each surface resulting in a reversal of pressure wave direction 24 alerting the fish 18 to the presence and location of the lure.

Figure 4:
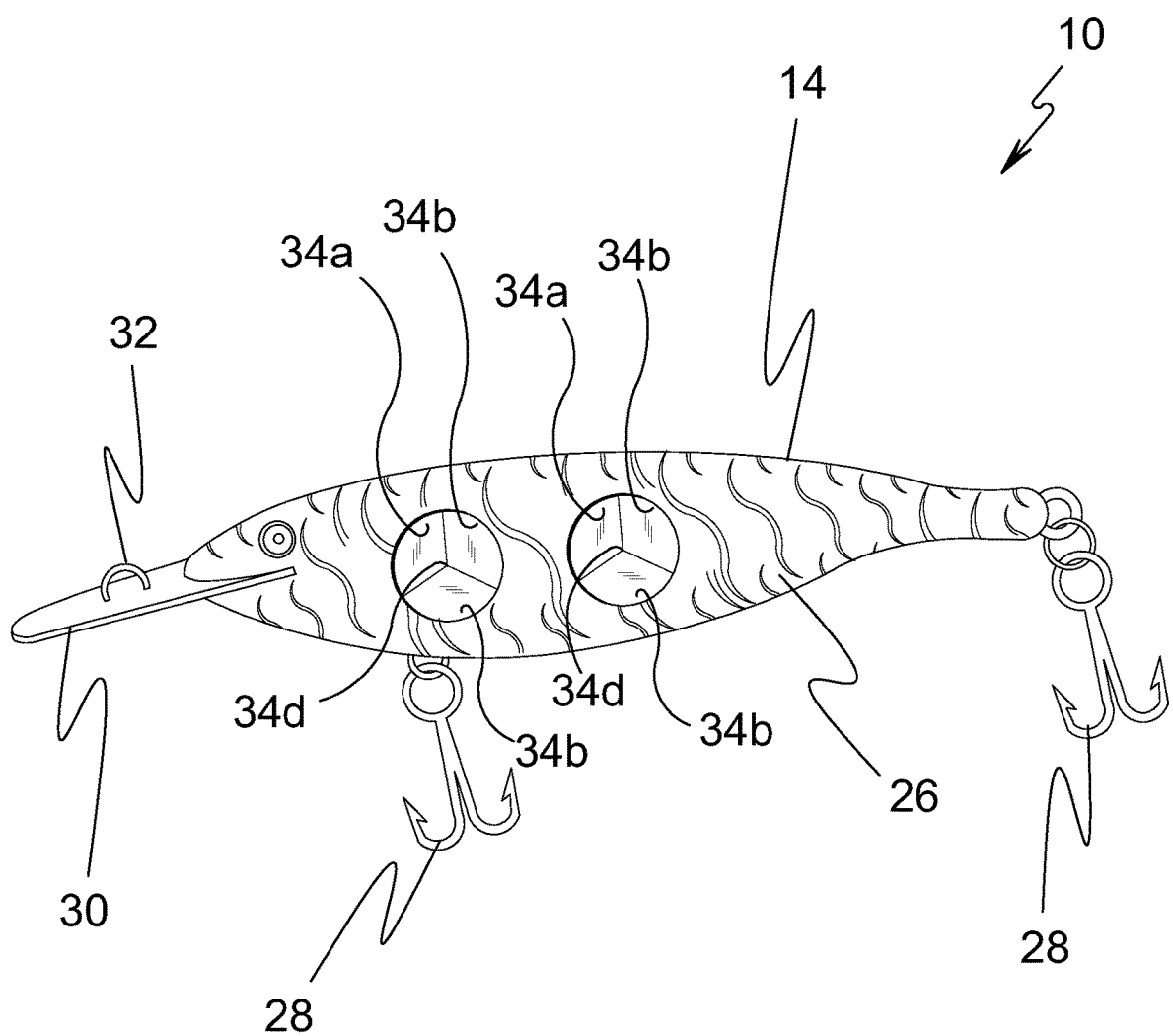
FIG. 4 is an illustrative view of a fishing lure having spaced apart cubic corner reflectors therein.

Referring to FIG. 4, shown is an illustrative view of a fishing lure having spaced apart cubic corner reflectors therein. Depicted is another fishing tackle lure 14 having lure body 26 with spaced apart cubic corner reflectors 12 imprinted or embedded in the body 26 of the lure 14.

Figure 5:
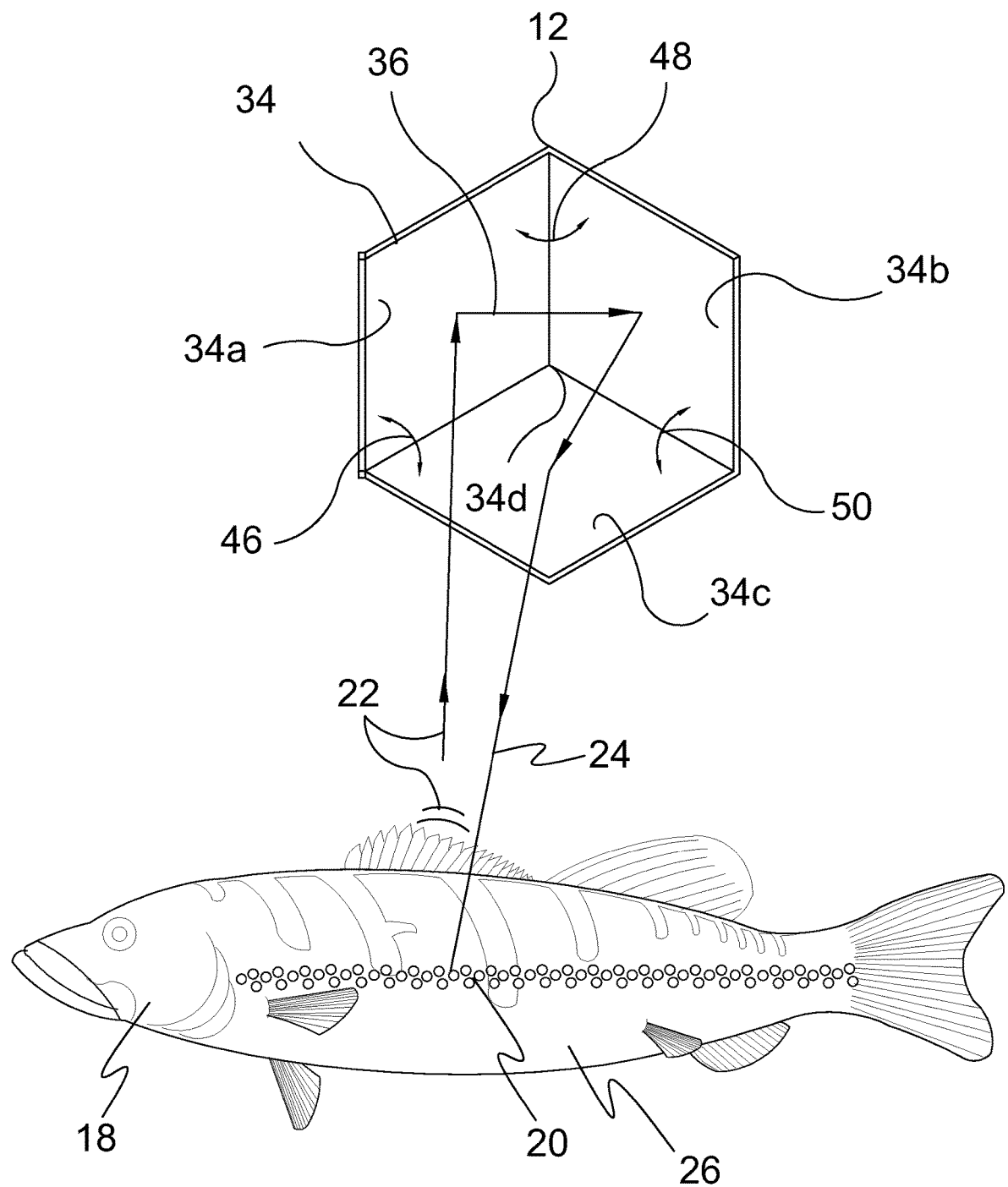
FIG. 5 is an exploded view of a cubic corner reflector in functional use.

Referring to FIG. 5, shown is an exploded view of cubic corner reflector in use. The pressure wave 22 propagated by the target fish 18 is "bounced" from surface 34a to 34b then 34c as indicated at 36, enhanced, and reflected back 24 from the imprinted or embedded cubic corner reflector 12 and is registered by the lateral line sensory organs 20. These lateral line sensors 20 on fish can be (as mentioned above) compared to the sense of touch, but also allow the fish to construct a 3D model of the surrounding medium and what is moving in it. Thus the enhanced reflection provided by the present invention draws the attention of the target fish 18 and increases the possibility of a strike on the lure 14 (not seen in this Figure). To go into more detail, and referring back to FIG. 3 the three planar wave reflecting surfaces 34a, 34b, and 34c are shown here again meeting at vertex 34d. It should be noted that the edge angles 46, 48, and 50 of the three wave reflecting surfaces 34a, 34b, and 34c could be other than the right (90°) angle shown. This could be by design or by deformation or bending as the lure 14 moves through the water. The periphery 34 of the cubic corner reflector 12 is seen here to be generally rectangular in shape but it should be emphasized that many peripheral shapes could be utilized without departing from the spirit of the invention.

Figure 6:
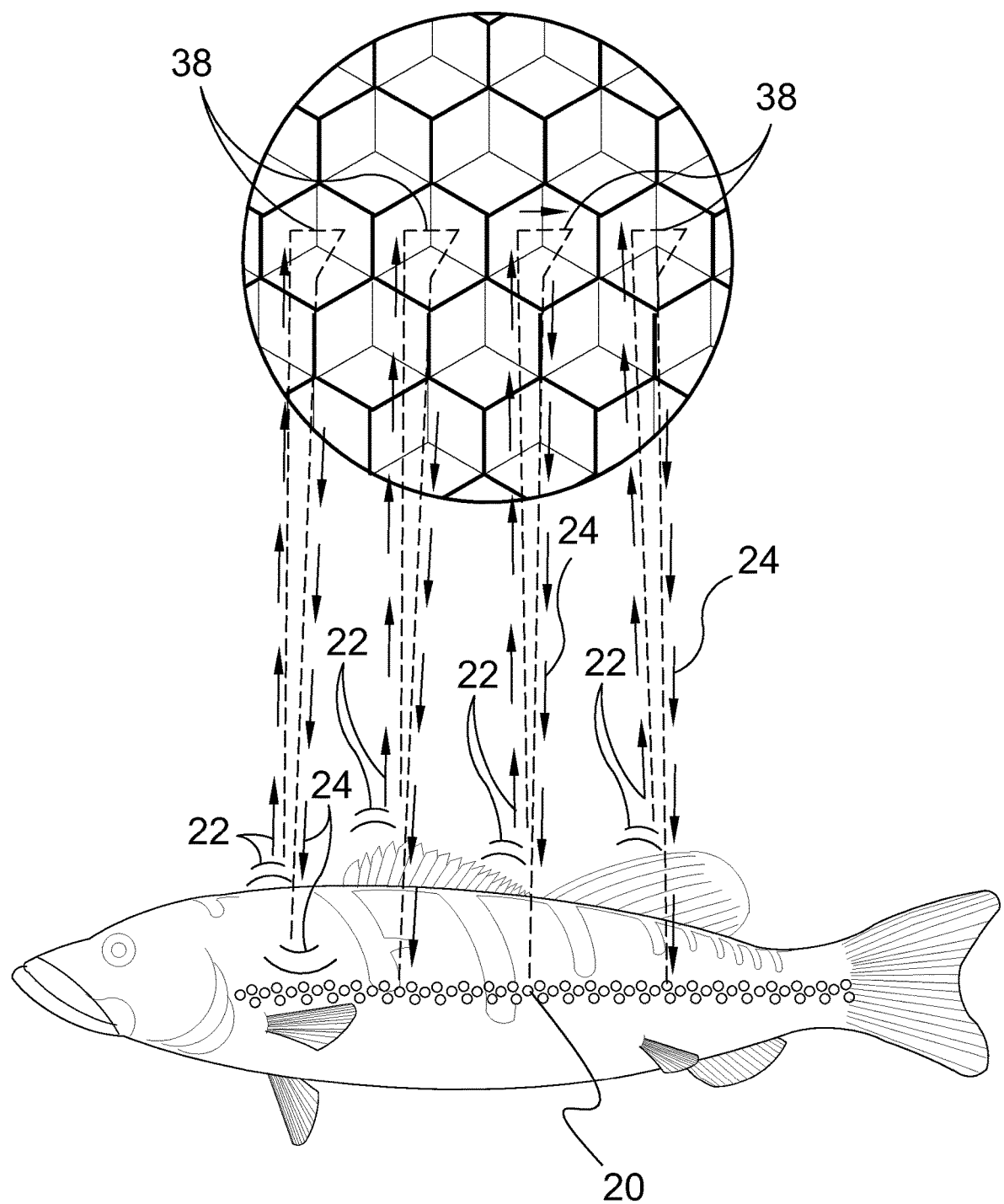
FIG. 6 is an exploded view of a plurality of cubic corner reflectors in functional use.

Referring to FIG. 6, shown is an illustrative view of the present invention. As in the previous Figure, the propagated waves, indicated at 22 are created by the target fish 18, moving through the water are reflected between the cooperating surfaces at 38 and redirected, indicated at 24, back to the sensory organs 20 of target fish 18. These enhanced and reflected waves enlarge the "picture" that the target fish has of the lure and entices it to strike.

Figure 7:
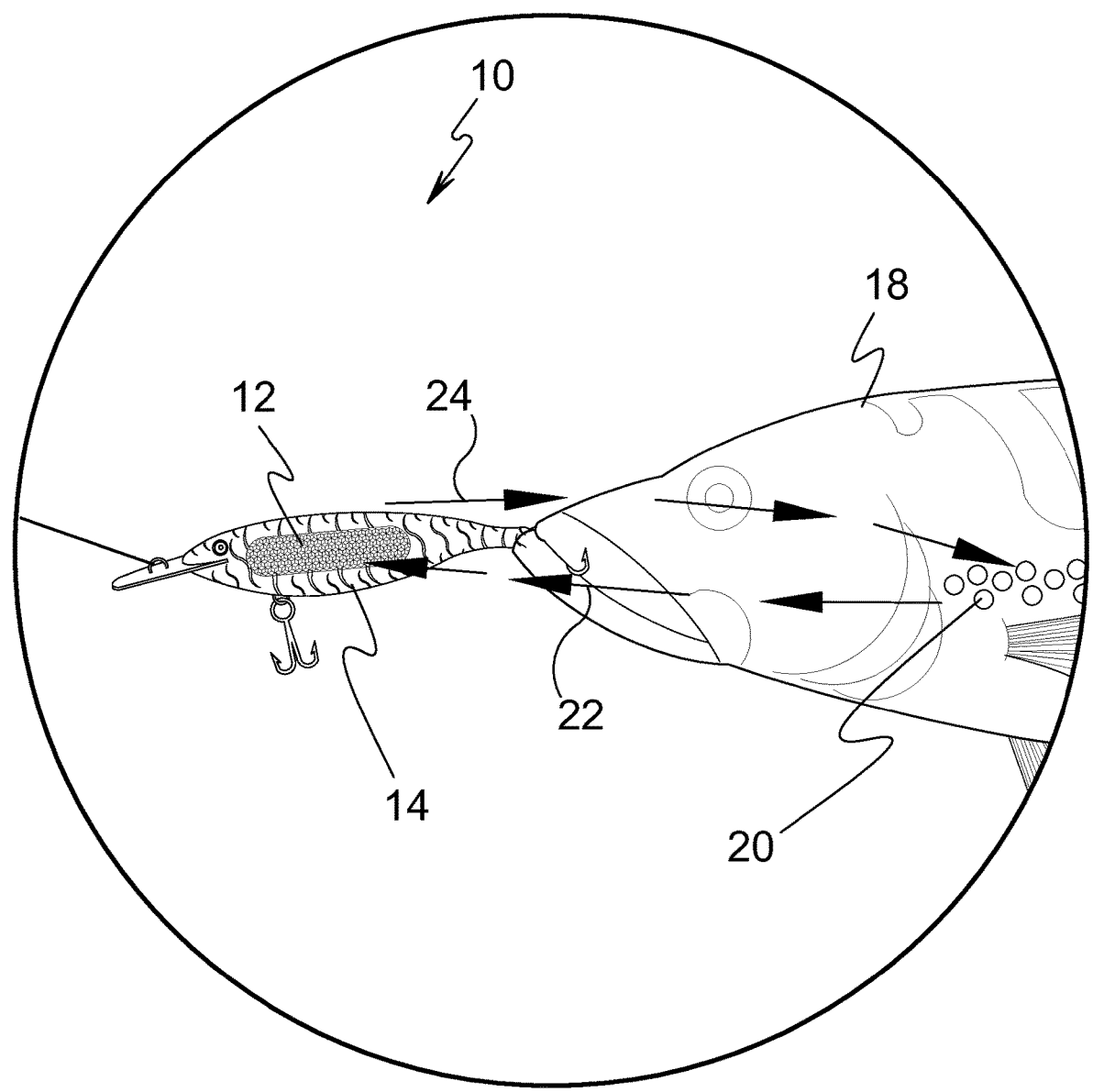
FIG. 7 is an illustrative view of the present invention in use.

Referring to FIG. 7, shown is an illustrative view of the present invention. Depicted is an illustrated view of an attack reaction brought about by the fishing tackle 10 incorporating cubic corner reflector(s) 12 seen here located on the fishing lure 14. As seen above the propagated pressure waves 22 from the target fish 18 are reflected as indicated at 24 and are received by the lateral line sensory organs 20.

Figure 8:
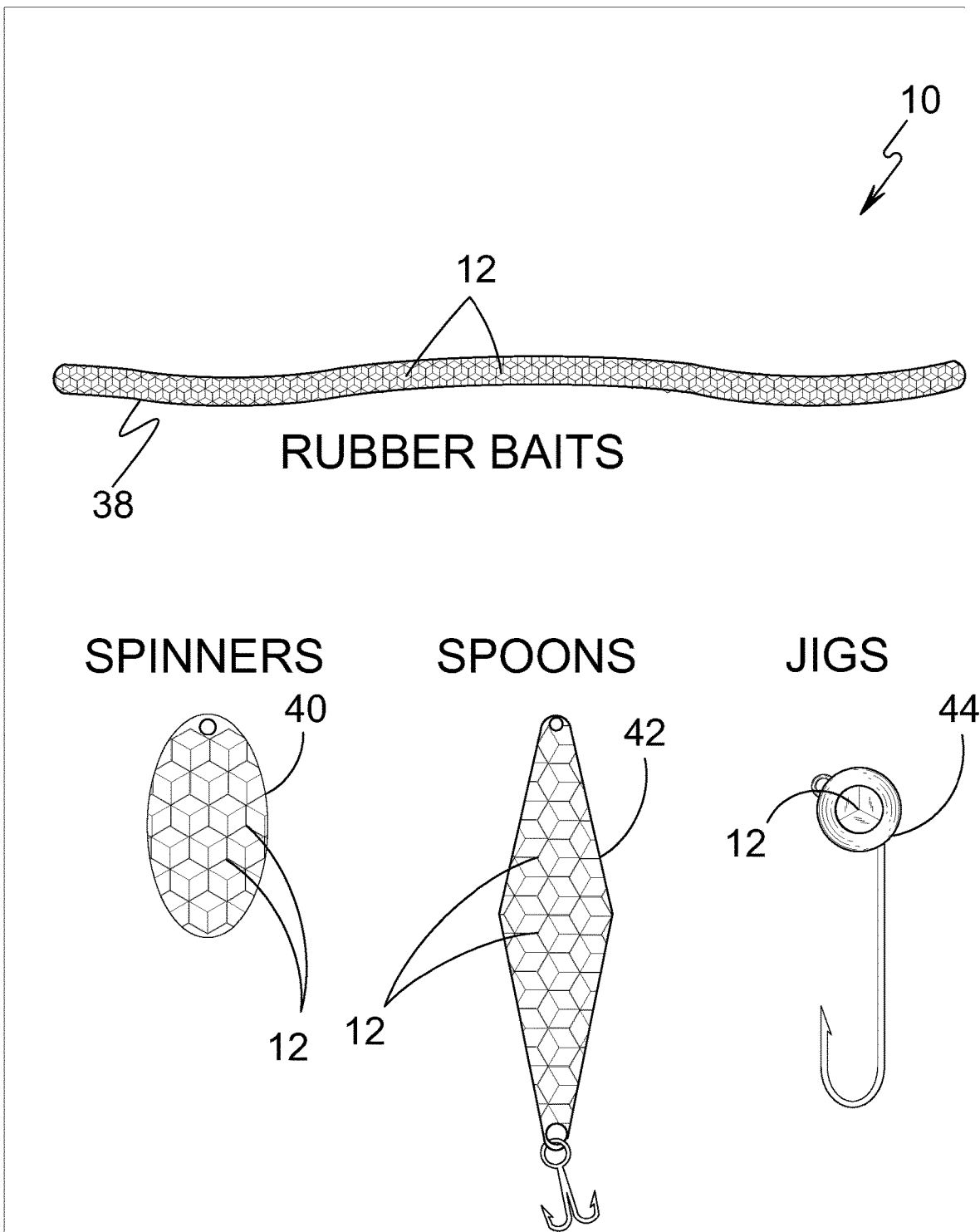
FIG. 8 is an illustrative view of lures incorporating the cubic corner reflectors of the present invention.

Referring to FIG. 8, shown is an illustrative view of lures incorporating the cubic corner reflector of the present invention. Shown, for illustrative purposes only, is the use of at least one cubic corner reflector 12 incorporated into fishing tackle, such as, rubber bait lures, spinners, spoons, jigs and sinkers. Shown at 38 is a soft-type bait such as a rubber worm or crawfish. The instant invention may be formed integrally during the manufacture of the fishing tackle or could be added later. At 40, a spinner-type lure is seen with the present invention disposed on its surface. At 42, a spoon-type lure is indicated and at 44 a jig lure includes the present invention. In all the lure types seen in the Figure, the cubic corner reflector/wave enhancement apparatus is marked at 12.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fishing lure having one or more cubic corner reflectors, comprising:
    a body;
    an eyelet connected to said body and configured to be secured to a fishing line;
    one or more fish hooks directly or indirectly connected to said body;
    one or more cubic corner reflectors that are recessed into said body and exposed to an ambient environment and are externally visible therefrom, each of said one or more cubic corner reflectors consisting of three adjoining planar surfaces recessed fully or partially into said body and oriented perpendicular to each other so that said three adjoining planar surfaces meet at a vertex directed inwardly into said body, said one or more cubic corner reflectors being configured to reflect an incoming fluid pressure wave received from a direction back in substantially a same direction from which the pressure wave was received.

2. The fishing lure having one or more cubic corner reflectors according to claim 1, wherein said body is a molded rubber bait secured to said one or more fish hooks.

3. The fishing lure having one or more cubic corner reflectors according to claim 1, wherein said fishing lure is a spoon lure.

4. The fishing lure having one or more cubic corner reflectors according to claim 1, wherein said fishing lure is a spinner lure.

5. The fishing lure having one or more cubic corner reflectors according to claim 1, wherein said fishing lure is a jig lure.

6. The fishing lure having one or more cubic corner reflectors according to claim 1, wherein said one or more cubic corner reflectors comprise a single corner reflector.

7. The fishing lure having one or more cubic corner reflectors according to claim 1, wherein said one or more cubic corner reflectors form a cluster of cubic corner reflectors.

8. The fishing lure having one or more cubic corner reflectors according to claim 1, wherein said one or more cubic corner reflectors form a cluster of conjoined cubic corner reflectors.

9. The fishing lure having one or more cubic corner reflectors according to claim 8, wherein said cluster of conjoined cubic corner reflectors encompass a substantially central region of said body.

10. The fishing lure having one or more cubic corner reflectors according to claim 8, wherein said cluster of conjoined cubic corner reflectors operates to reflect and enhance fluid pressure waves received from a moving fish thereby enlarging a sensed profile of said fishing lure for the moving fish and increasing a probability of the moving fish striking said fishing lure.

11. The fishing lure having one or more cubic corner reflectors according to claim 8, wherein each said conjoined cubic corner reflector is conjoined with 1 to 6 adjacent cubic corner reflectors of said cluster of conjoined cubic corner reflectors.

12. The fishing lure having one or more cubic corner reflectors according to claim 1, wherein said fishing lure has a first side and a second side and at least one of said first and second sides of said fishing lure comprises said one or more cubic corner reflectors.

13. The fishing lure having one or more cubic corner reflectors according to claim 12, wherein said at least one of said first and second sides of said fishing lure comprises said one or more cubic corner reflectors further comprising two or more cubic corner reflectors forming a cluster of cubic corner reflectors.

14. The fishing lure having one or more cubic corner reflectors according to claim 13, wherein said at least one of said first and second sides of said fishing lure comprises said two or more cubic corner reflectors forming a cluster of conjoined cubic corner reflectors.

15. The fishing lure having one or more cubic corner reflectors according to claim 14, wherein each of said two or more cubic corner reflectors on said at least one of said first and second sides of said fishing lure is conjoined with 1 to 6 adjacent cubic corner reflectors of said one or more cubic corner reflectors of the cluster of conjoined cubic corner reflectors.

* * * * *